US007689869B2

(12) United States Patent
Terashita et al.

(10) Patent No.: US 7,689,869 B2
(45) Date of Patent: Mar. 30, 2010

(54) UNIT, METHOD AND PROGRAM FOR DETECTING IMPRECISE DATA

(75) Inventors: Yoshihiko Terashita, Kanagawan-ken (JP); Tohru Sumiyoshi, Kanagawan-ken (JP); Hiroyuki Miyoshi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 11/292,563

(22) Filed: Dec. 2, 2005

(65) Prior Publication Data

US 2006/0136777 A1 Jun. 22, 2006

(30) Foreign Application Priority Data

Dec. 2, 2004 (JP) .............................. 2004-349947

(51) Int. Cl.
*G06F 11/00* (2006.01)
(52) U.S. Cl. ........................................... 714/42; 714/6
(58) Field of Classification Search .................... 714/6, 714/42
See application file for complete search history.

(56) References Cited

U.S. PATENT DOCUMENTS 6,985,996 B1 * 1/2006 Nagshain ................... 711/114
2003/0179607 A1 * 9/2003 Orii ....................... 365/189.07
2005/0055522 A1 * 3/2005 Yagi ........................... 711/163

FOREIGN PATENT DOCUMENTS

JP 2001-338468 A 12/2007

OTHER PUBLICATIONS

Mikhailov Dmitry, "NT Disc System Reliability", Feb. 17, 2004, NT File System, http://web.archive.org/web/20040217223359/http://www.digit-life.com/articles/ntfs/index2.html.*

* cited by examiner

*Primary Examiner*—Scott T Baderman
*Assistant Examiner*—Jigar Patel
(74) *Attorney, Agent, or Firm*—Harrington & Smith, LLP

(57) ABSTRACT

When data are transferred to a cache from disk drives, through a back end I/F unit, a redundant code verifier of a data path controller compares write-history information (a Destaging Counter (DC) value) embedded in a redundant code of the data with a DC value embedded in a redundant code of a corresponding parity, thereby verifying whether the data are imprecise. In addition, in a case where the data are updated, the redundant code verifier makes a similar verification when old data to be used for creating a parity are read. When the data are not imprecise, a redundant code generator of the data path controller adds to new data and the parity a redundant code into which a new DC value has been embedded. When the data are imprecise, a controller informs a host of an occurrence of a problem through a front end I/F unit.

17 Claims, 8 Drawing Sheets

UNIT, METHOD AND PROGRAM FOR DETECTING IMPRECISE DATA

TECHNICAL FIELD

The exemplary embodiments of this invention relate to a unit for detecting an imprecise data generated, for example, by an error in an address where data are written into a memory device.

BACKGROUND

A problem that a storage sub-system returns imprecise data to a host system in reply to READ command causes not only loss of user data but also serious failure such as system failure. For this reason, in general, the storage sub-system avoids the problem that the imprecise data is returned to the host system by adding redundant data such as parity, ECC (Error Correcting Code) and CRC (Cyclic Redundancy Check) code to each data and checking the redundant data upon reading each data.

For example, a middle range or upper class RAID (Redundant Array of Inexpensive Disks) sub-system may add 8 to 16 bytes of redundant code to a sector of data of 512 bytes, which is a minimum unit of the user data upon writing (destaging) from a cache to a disk drive. Then, this redundant code is checked upon reading (staging) from the disk drive to the cache. In this way, error detection is performed in a data path after a backend interface of a RAID controller. Incidentally, in this case, the redundant code is data calculated uniquely out of the sector data of 512 bytes, and a code based on LRC (Longitudinal Redundancy Check), CRC (Cyclical Redundancy Check) or the like is generally used.

Meanwhile, when data are written into an actual disk drive, in some cases, a temporary abnormal event occurs during head seek by the drive due to external cause such as vibration. Data may be written into an LBA (Logical Block Address) different from the LBA specified by the WRITE request. However, in such a case, it sometimes occurs that an error of writing position cannot be detected by above described redundant codes at storage sub-system side.

This is specifically explained with reference to FIG. 8. As shown in the drawing, it is assumed that a sector data 1 (512 bytes) and LRC1, which is a redundant code corresponding to the sector data 1, are stored in LBA1, and a sector data 2 (512 bytes) and LRC2, which is a redundant code corresponding to the sector data 2, are stored in LBA2. Under this condition, the sector data 1 and the LRC1 are read from the LBA1 at procedure 1, and the LRC1 is checked at procedure 2. As a result, if the sector data 1 is consistent with the LRC1, the sector data 1 is modified at procedure 3, new LRC (LRC1') is calculated at procedure 4, and corrected sector data 1' and the LRC1' are written into the LBA1 at procedure 5.

However, as shown in the drawing, it is assumed that data to be written into the LBA1 is written into the LBA2. In other words, the sector data 1 and the LRC1 which should originally be overwritten at procedure 5, remain stored in the LBA1.

Under this condition, if the sector data 1 and the LRC1 are read from the LBA1 at procedure 6 and the LRC1 is checked at procedure 7, it is judged that the sector data 1 is consistent with the LRC1.

That is, although imprecise data, which should originally not be returned, are returned at procedure 6, they cannot be detected at procedure 7. Moreover, under this condition, although not shown in the drawing, the sector data 1' and the LRC1' are assumed to be read from the LBA2. In this case too, data to be originally written into the LBA1 are read and furthermore, since the sector data 1' is consistent with the LRC1', it is impossible to detect the error of writing position.

In this way, a problem (hereinafter referred to as (the problem)) occurs that a storage sub-system returns imprecise data to a host system in reply to READ command.

Therefore, in some cases, for the problem, it is made possible to detect that the drive read data from a false address, by incorporating LBA information into a redundant code. By adopting this method, it becomes possible to detect an error for the case where there is a difference between the LBA to be written and the LBA actually written. Taking FIG. 8 as an example for explanation, it corresponds to the case where data is to be read from the LBA2 after procedure 5.

However, even by adopting this method, it is impossible to detect an error in the case where data are read from the LBA1 after procedure 5, since LBA1 information is included in the redundant code corresponding to the data which should have been overwritten at procedure 5 but were not actually overwritten. Therefore, there still remains a possibility that the problem occurs, even in a case where such a method is adopted.

As a prior art to detect an occurrence of the problem, there has been a method as described in the following. A disk drive unit or a host system stores write-history information within the data and at a different position within a disk when data are written, and these respectively stored write-history information are compared and verified when the data are read (for example, refer to Japanese Patent Laid-Open Number: Tokkai 2001-338468 (Pages 5 to 6, FIGS. 5 to 6)).

However, the invention of the Japanese Patent Laid-Open Number: Tokkai 2001-338468 (Pages 5 to 6, FIGS. 5 to 6) has the problem that a write-history is stored in an area which has no relation with a sector data and capacity of a drive is consumed. Furthermore, it also has the problem that since the write-history needs to be read differently from the sector data, it affects performance of reading.

SUMMARY OF THE PREFERRED EMBODIMENTS

The foregoing and other problems are overcome, and other advantages are realized, in accordance with the exemplary embodiments of this invention.

Disclosed in accordance with a first exemplary embodiment of this invention is a device for detecting a data error in a memory, comprising an addition unit for adding history information to the data, which is updated in accordance with updating of data to be stored in a first sector in the memory, and to data to be stored in a second sector in the memory; and a verification unit for verifying the data stored in the first sector and the data stored in the second sector by making a comparison between the history information which has been added to the data stored in the first sector and the history information which has been added to the data stored in the second sector.

Disclosed in accordance with a second exemplary embodiment of this invention is a method to detect imprecise data, comprising adding history information, which is updated in accordance with updating of one data among the plurality of data, to the one data and to another data among the plurality of data; writing the one data to a first sector in a memory and writing the another data to a second sector in the memory; reading data stored in the first sector and data stored in the second sector; and verifying the two data by comparing the history data added respectively to the two read-out data.

Disclosed in accordance with a further exemplary embodiment of this invention is a computer program product that comprises a computer useable medium including a computer readable program, where the computer readable program when executed on the computer causes the computer to perform operations that comprise: obtaining first history information that is updated in accordance with updating of first data stored in first sector of a memory; obtaining second history information that is updated in accordance with updating of second data stored in second sector of the memory; and verifying the first data or the second data by comparing the first history information with the second history information.

Disclosed in accordance with a still further exemplary embodiment of this invention is a controller for a data storage system that comprises a plurality of data storage disks comprising a data storage memory and a cache. The controller includes a first interface for coupling to the data storage memory and a second interface for coupling to a host, and further includes redundant code verifier circuitry, responsive to data being transferred to the cache from the data storage memory to compare a first Destaging Counter (DC) value, indicative of write-history information, that is contained in a redundant code of the data with a second DC value that is contained in a redundant code of corresponding data integrity data to thereby verify whether the data being transferred is in error.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 7-1 is the flow chart showing an example of operation of destaging process according to the embodiment of the present invention.

FIG. 7-2 is the flow chart showing an example of operation of destaging process according to the embodiment of the present invention.

DETAILED DESCRIPTION OF THE INVENTION

Figure 1:
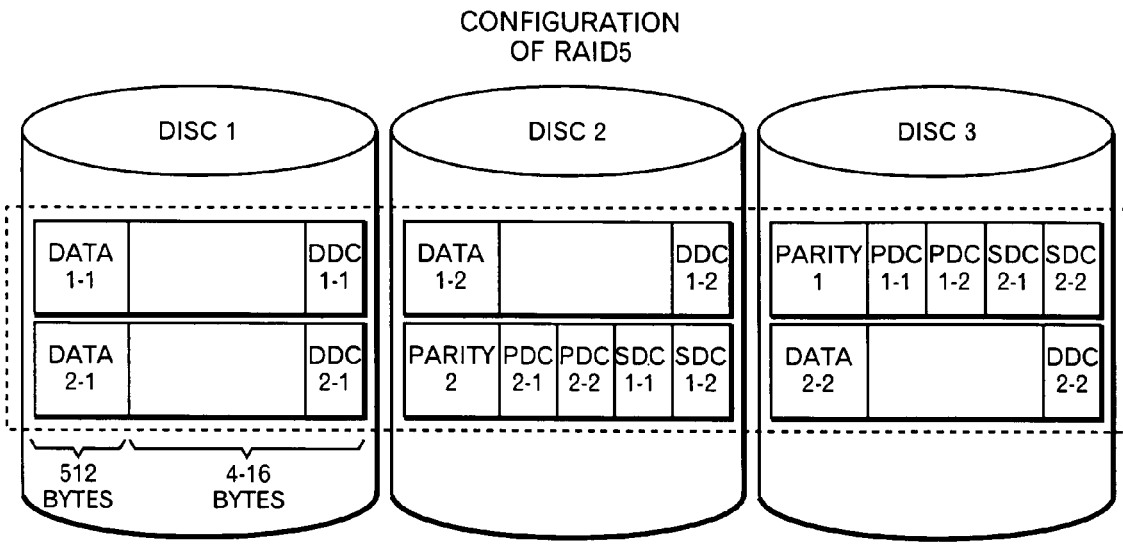
FIG. 1 is diagram showing a first example of arrangement of user data, parity data and DC value according to an embodiment of the present invention.

Hereinafter, the exemplary embodiments of this invention will be described in detail with reference to the accompanying drawings (hereinafter, referred to as "aspect of embodiment"). An aspect of this embodiment is that the present invention is applied to a disk array system which performs data protection by use of parity such as RAID5. In the disk array system like this, a plurality of sector data (hereinafter referred to as "user data") obtained by partitioning data transmitted from a host system by a sector size and a sector data (hereinafter referred to as "parity data") to detect imprecise user data and restore it are stored in a plurality of disks in a distributed manner. Moreover, in a sector where the user data are stored (hereinafter referred to as "data sector"), an area where redundant codes to check validity of the user data are stored is concomitantly provided, and in a sector where parity data are stored (hereinafter referred to as "parity sector"), an area where redundant codes to check validity of the parity data are stored is concomitantly provided.

According to the embodiment of the present invention, by paying attention to such a configuration of the disk array system, write-history information to be updated in conjunction with updating of the user data are provided in a redundant code area of the data sector where the user data are stored, and in a redundant code area of the parity sector where the parity data for the user data are stored. Here, as the write-history information, any kind of information may be adopted, while a counter to be increased by one upon updating of the user data is adopted in the aspect of the embodiment. In this case, since the write-history information can be grasped as the counter to show a number of destaging of the user data, such a counter is referred to as a DC (Destaging Counter), and a value set to the DC is referred to as a DC value hereinafter.

Next, with reference to FIGS. 1 and 2, arrangement of user data, parity data, DC value and the like in a configuration of RAID assumed in the aspect of the embodiment will be described in detail. Note that in the aspect of the embodiment, for convenience sake, the DC which is provided in the redundant code area of the data sector is referred to as a DDC (Data DC) and a value which is set to the DDC is referred to as a DDC value.

Moreover, among the parity data associated with the noted user data, a first priority parity data (primary parity data) and a second priority parity data (secondary parity data) are determined. Then, the DC provided in the redundant code area of the parity sector where the primary parity data are stored is referred to as a PDC (Primary DC), and a value set to the PDC is referred to as a PDC value. Meanwhile, DC provided in the redundant code area of the parity sector where the secondary parity data is stored (secondary parity sector) is referred to as a SDC (Secondary DC), and a value set to SDC is referred to as a SDC value.

For example, in the case of RAID5 or the like, a parity sector existing in the same slice as the data sector where the noted user data are stored is set as a primary parity sector, and a DC maintained in the redundant code area of the sector is set as a PDC. Moreover, it is assumed that a parity sector existing in the different slice with the data sector where the noted user data are stored is set as a secondary parity sector, and a DC maintained in the redundant code area of the sector is set as an SDC.

Furthermore, in the case of RAID50 or the like, a parity sector existing in one of mirrored slices is set as a primary parity sector, and a DC maintained in the redundant code area of the sector is set as a PDC. Then, it is assumed that a parity sector existing in the other slice of the mirrored slices is set as a secondary parity sector, and a DC maintained in the redundant code area of the sector is set as an SDC.

FIG. 1 is a diagram showing a configuration of RAID5. In FIG. 1, three disks are prepared, and an area for sector data of 512 bytes and an area for redundant code of 4 to 16 bytes are provided in each disk. Moreover, in two arbitrarily selected slices, as shown in the drawing, user data (indicated as "data" in the drawing), parity data (indicated as "parity"), DDC value (indicated as "DDC"), PDC value (indicated as "PDC") and SDC value (indicated as "SDC") are maintained. In other words, in the redundant code area of the data sector where the user data 1-1, 1-2, 2-1 and 2-2 are stored, the DDCs 1-1, 1-2, 2-1 and 2-2 are respectively maintained as the DC value for each user data. Moreover, a parity data 1 is primary parity data for the user data 1-1 and 1-2 as well as secondary parity data for the user data 2-1 and 2-2. Therefore, in the redundant code area of the parity sector where the parity data 1 is stored, PDCs 1-1 and 1-2 corresponding to DDCs 1-1 and 1-2 are maintained, while SDCs 2-1 and 2-2 corresponding to DDCs 2-1 and 2-2 are maintained. Meanwhile, parity data 2 is primary parity data for the user data 2-1 and 2-2 as well as secondary parity data for the user data 1-1 and 1-2. Therefore, in the redundant code area of the parity sector where the parity data 2 is stored, PDCs 2-1 and 2-2 corresponding to DDCs 2-1 and 2-2 are stored, while SDCs 1-1 and 1-2 corresponding to DDCs 1-1 and 1-2 are maintained.

Figure 2:
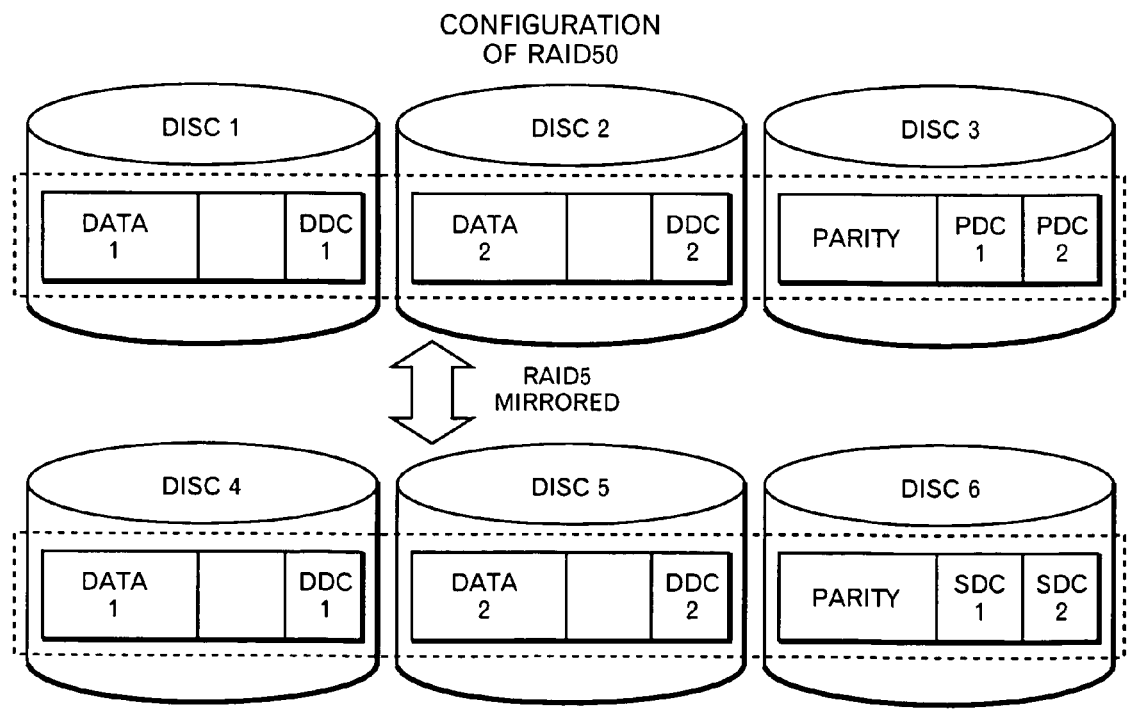
FIG. 2 is a diagram showing a second example of arrangement of user data, parity data and DC value according to the embodiment of the present invention.

Moreover, FIG. 2 is a diagram showing a configuration of RAID50. In FIG. 2 similar to in FIG. 1, three disks are prepared and although not illustrated, a sector data area of 512 bytes and a redundant code area of 4 to 16 bytes are provided in each disk. Moreover, this RAID50 configuration is a configuration of mirrored RAID5s and data stored in the disks 1 to 3 are also respectively stored in disks 4 to 6. Furthermore, in these mirrored slices, as shown in the drawing, user data (indicated as "data" in the drawing), parity data (indicated as "parity"), DDC value (indicated as "DDC"), PDC value (indicated as "PDC") and SDC value (indicated as "SDC") are maintained. In other words, in the redundant code area of the data sector where the user data 1 and 2 are stored, DDCs 1 and 2 are maintained as DC values for each user data. Furthermore, since parity data to be stored in the disk 3 is primary parity data for the user 1 and 2, in the redundant code area of the parity sector where this parity data is stored, PDCs 1 and 2 corresponding to DDCs 1 and 2 are maintained. Meanwhile, since parity data to be stored in the disk 6 is secondary parity data for the users 1 and 2, in the redundant code area of the parity sector where this parity data is stored, SDCs 1 and 2 corresponding to DDCs 1 and 2 are maintained.

Figure 3:
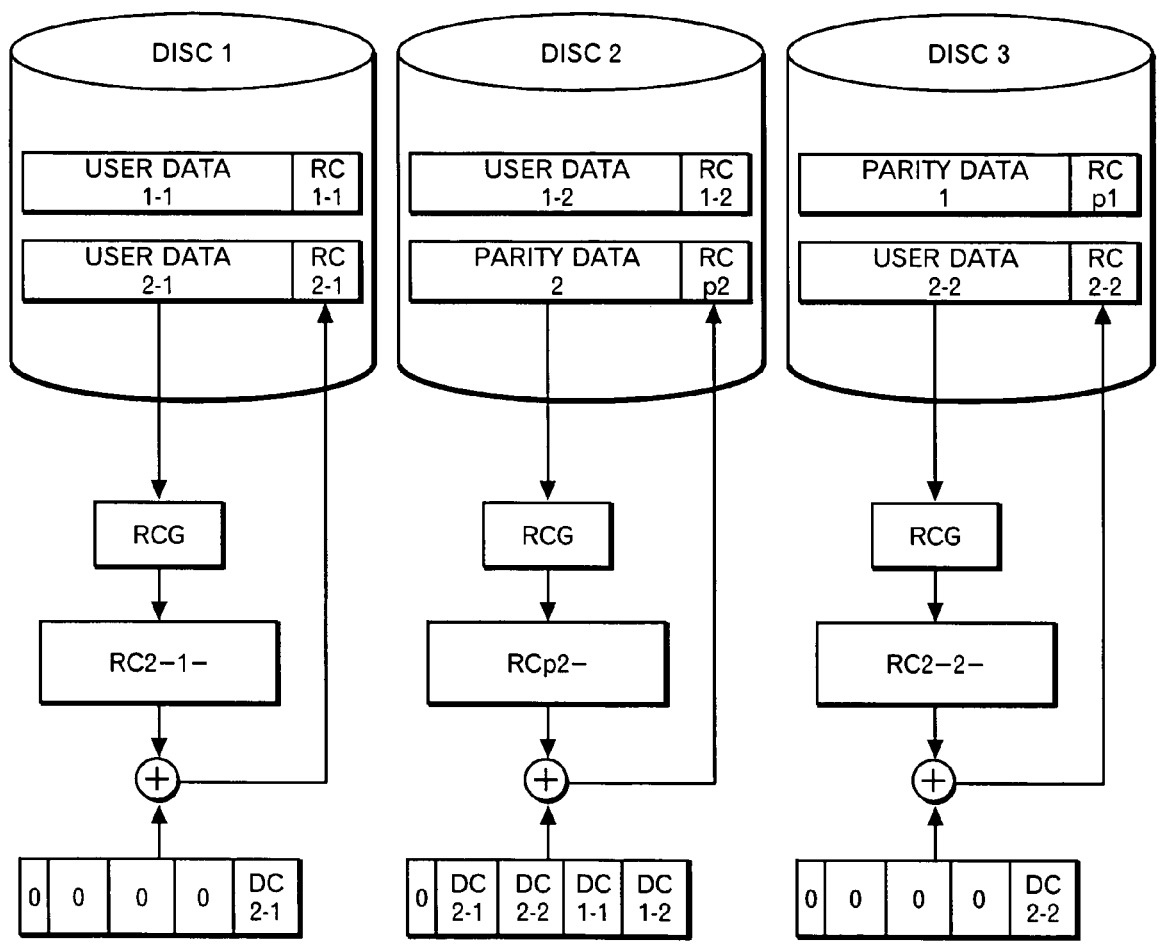
FIG. 3 is a diagram showing an example of storage method of the DC value to a redundant code according to the embodiment of the present invention.

Next, with reference to FIG. 3, a storing method of the DC value to the redundant code area will be described. Note that FIG. 3 shows the storing method of the DC value in the configuration of RAID5 of FIG. 1.

As described above, the DC value for each user data is stored in the redundant code area of each sector as a redundant code (RCx) for the user data and as a redundant code (RCpx) of the parity data corresponding to the user data. Specifically, first a RCG (Redundant Code Generator) generates redundant codes out of each sector data by use of a conventional method. Then, new redundant code obtained by an XOR operation of the redundant code thus generated and the DC value to be stored is stored in the redundant code area of each sector.

For example, in the case where the DC value is stored in a redundant code RC 2-1 of the user data 2-1, the storing method is as follows.

Firstly, the RCG generates the redundant code RC 2-1-out of the user data 2-1 by use of the conventional method. Then, the XOR operator performs an XOR operation of the RC 2-1- and the DC 2-1, thereby a new redundant code RC 2-1 is obtained. This new redundant code is stored in the redundant code area.

Moreover, in the case where a DC value is stored in a redundant code RCp2 of the parity data 2, the storing method is as follows.

Firstly, the RCG generates a redundant code RCp2-out of the parity data 2 by use of the conventional method. Then, the XOR operator performs an XOR operation of the RCp2- and bit sequence made of the DCs 2-1, 2-2, 1-1 and 1-2, thereby a new redundant code RCp2 is obtained. This new redundant code is stored in the redundant code area. Moreover, the DC value is stored to the redundant code RC 2-2 of the user data 2-2 similarly to the case of the user data 2-1.

Next, an example of configuration and operation of a storage sub-system which generates and verifies a redundant code including such a DC value will be described in detail.

Figure 4:
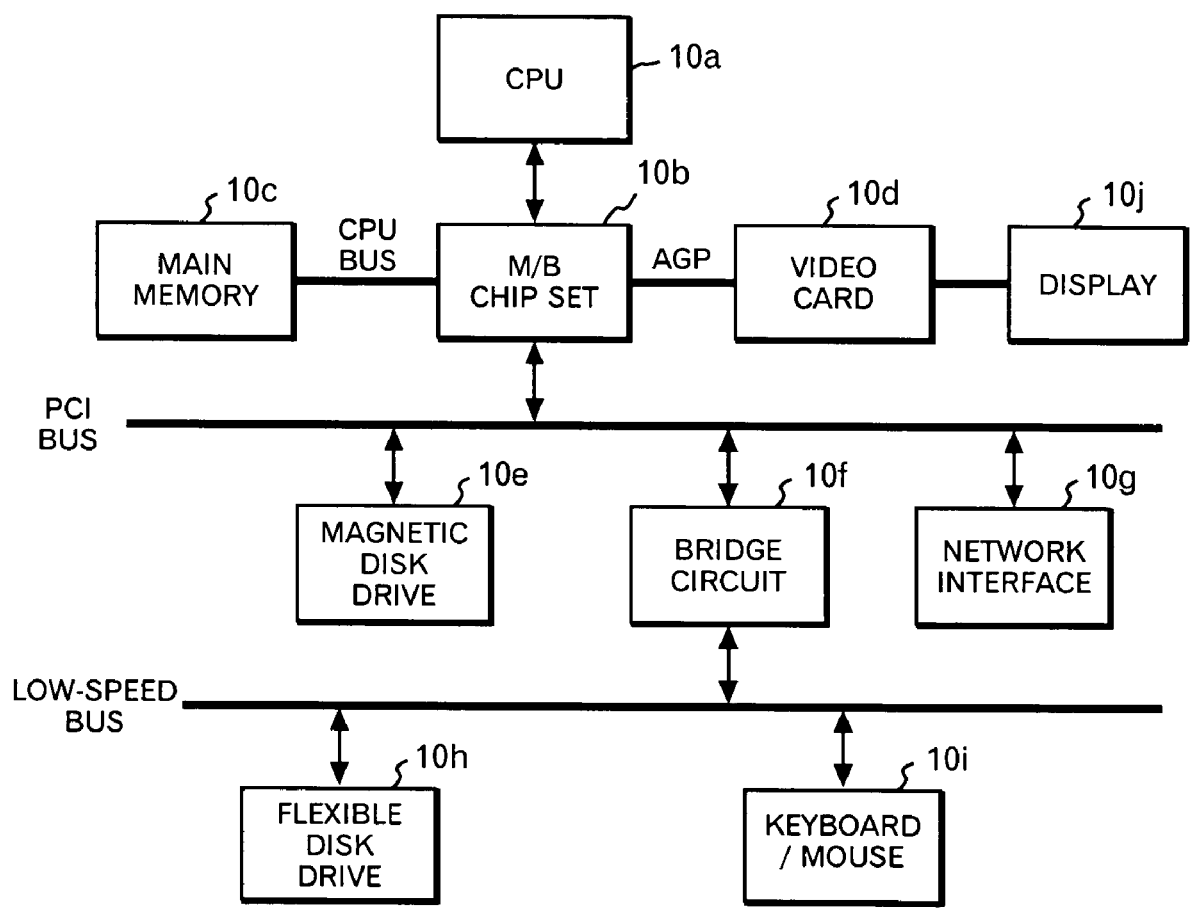
FIG. 4 is a block diagram showing a hardware configuration of a computer to realize a storage sub-system according to the embodiment of the present invention.

FIG. 4 is a diagram schematically showing an example of a hardware configuration of a computer to be used preferably as such a storage sub-system.

The computer shown in FIG. 4 includes: a CPU (Central Processing Unit) 10a as an operation means; a main memory 10c also connected to the CPU 10a through a M/B (mother board) chip set 10b and a CPU bus; a video card 10d connected to the CPU 10a through the M/B chip set 10b and an AGP (Accelerated Graphics Port); and a display 10j. The computer further includes: a magnetic disk drive (HDD) 10e connected to the N/B chip set 10b through a PCI (Peripheral Component Interconnect) bus, and a network interface 10g. The computer furthermore includes: a flexible disk drive 10h connected from the PCI bus to the N/B chip set 10b through a bridge circuit 10f and a low speed bus such as an ISA (Industrial Standard Architecture) bus; and a keyboard/mouse 10i.

Note that FIG. 4 merely shows an example of the hardware configuration of the computer to realize the aspect of the embodiment, and various other types of configurations can be adopted as far as the aspect of the present embodiment can be applied. For example, the computer may be configured in such a manner that instead of providing the video card 10d only a video memory is mounted and an image data may be processed by the CPU 10a. The computer may be also configured in such a manner that as an external memory device, a drive of a CD-R (Compact Disk Recordable) or a DVD-RAM (Digital Versatile Disk Random Access Memory) is provided through an interface such as ATA (AT Attachment) and SCSI (Small Computer System Interface).

Figure 5:
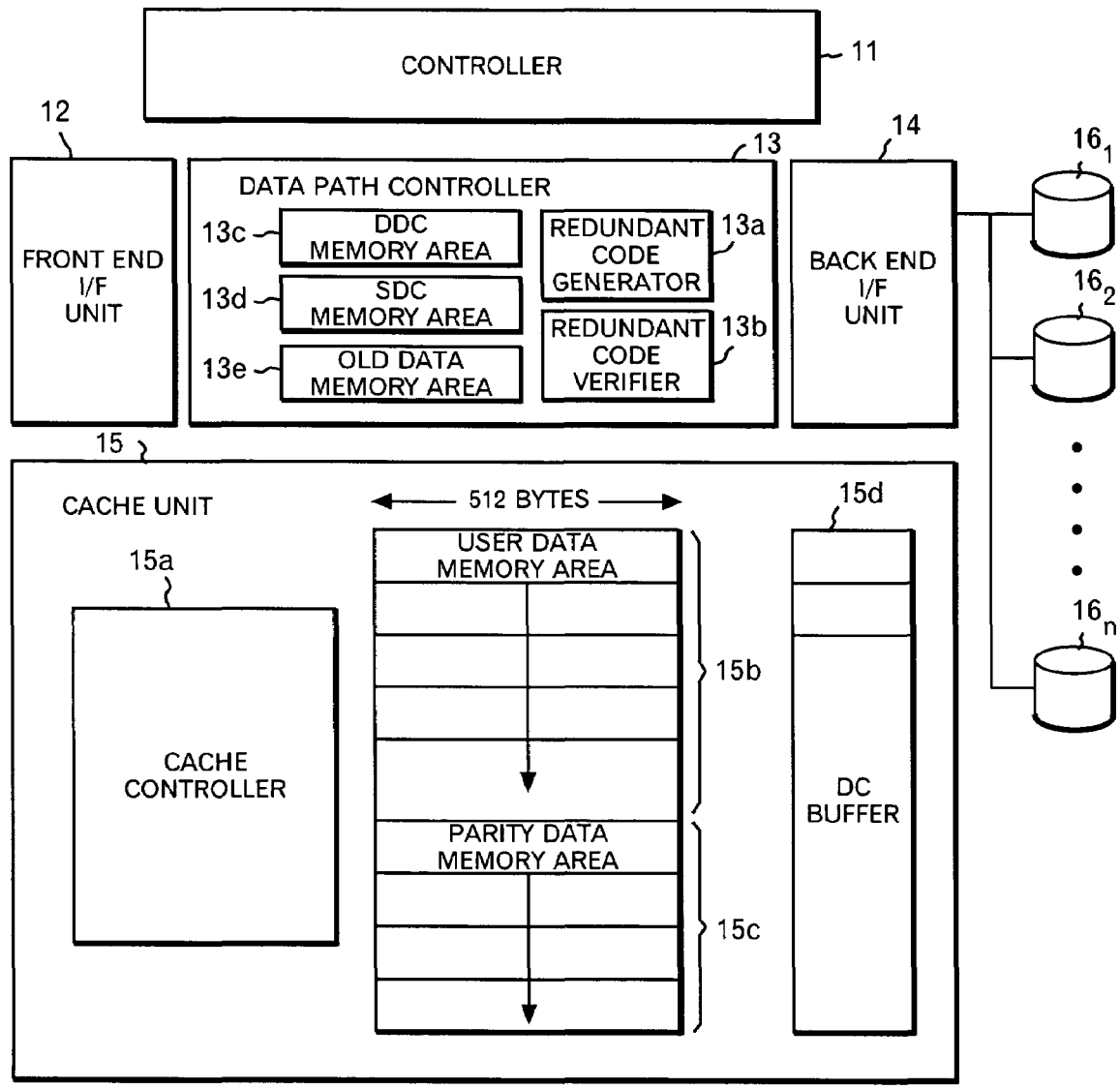
FIG. 5 is a block diagram showing a function structure of the storage sub-system according to the embodiment of the present invention.

FIG. 5 is a diagram showing a configuration of a storage sub-system of the aspect of the embodiment. This storage sub-system includes: a controller 11; a front end interface (I/F) unit 12 (hereinafter referred to as "front end I/F unit"); a data path controller 13; a back end interface unit 14 (hereinafter referred to as "back end I/F unit"); a cache unit 15; and disk drives 161, 162, - - - , 16n. The controller 11 controls the entire storage sub-system. Incidentally, the controller 11 also has a function of specifying the sector where a problem occurred, among the data sector, the primary parity sector and the secondary parity sector on the basis of information passed from the data path controller 13. This function can be grasped as "specification means". The front end I/F unit 12 functions as an interface between the host system and the storage sub-system.

Moreover, the data path controller 13 controls the data path between the back end I/F unit 14 and the cache unit 15, and further includes a redundant code generator 13a, a redundant code verifier 13b, a DDC memory area 13c, an SDC memory area 13d and an old data memory area 13e. Incidentally, the data path controller 13 also has a function of adding a redundant code generated by the redundant code generator 13a to data. This function can be grasped as "addition means". Meanwhile, the redundant code verifier 13b can be grasped as "verification means". The back end I/F unit 14 functions as an interface between the storage sub-system and the disk drives 161, 162, - - - , 16n.

In addition, the cache unit 15 caches user data, parity data and DC value read from the disk drives 161, 162, - - - , 16n, and further includes a cache controller 15a, a user data memory area 15b, a parity data memory area and a DC buffer 15d.

The disk drives 161, 162, - - -, 16n are memory to store the user data and the parity data which become objects to be processed by the storage sub-system, and correspond to the disks 1 to 3 in FIG. 1 as well as the disks 1 to 6 in FIG. 2.

Next, an internal configuration of the data path controller 13 will be described. The redundant code generator 13a has a function of calculating redundant codes when the user data are transferred from the cache unit 15 to the back end I/F unit 14 in response to WRITE request to the drive. The redundant code is calculated in such a manner that a corresponding DC value in the DC buffer 15d is read, and an XOR operation of the redundant code obtained by use of the conventional method and the DC value thus read is performed.

Moreover, the redundant code verifier 13b has a function of verifying the redundant code when the user data are transferred from the back end I/F unit 14 to the cache unit 15 in response to READ request to the drive. The redundant code is verified in such a manner that a DC value is obtained by performing the XOR operation of the redundant code obtained from the user data by use of the conventional method and the redundant code read from the drive, and the DC value thus obtained is compared with the DC value stored in the DC buffer 15d.

The DDC memory area 13c is an area where the DDC value obtained from the redundant code of the user data is temporarily stored, while the SDC memory area 13d is an area where the SDC value obtained from the redundant code of the secondary parity data is temporarily stored. The old data memory area 13e is the area where data before change (hereinafter referred to as "old data") which has been read before destaging is temporarily stored.

Note that these functions are realized in collaboration with software resource and hardware resource. Specifically, the CPU 10a to realize the storage sub-system reads programs which realize the functions of the redundant code generator 13a and the redundant code verifier 13b out of the external memory device into the main memory 10c, and performs processing while making reference to the information stored in the DDC memory area 13c, the SDC memory area 13d and the old data memory area 13e in the main memory 10c, depending on necessity.

Next, an internal configuration of the cache unit 15 will be described. The cache controller 15a has a function of controlling read/write of information from/to the user data memory area 15b, the parity memory area 15c and the DC buffer 15d. For example, the cache controller 11a controls what kind of information is stored in the user data memory area 15b, the parity data memory area 15c and the DC buffer 15d, and also controls whether the DC value stored in the DC buffer 15d is already verified or not.

The user data memory area 15b is an area for storing the user data which are read out of the disk drives 161, 162, - - -, 16n, while the parity data memory area 15c is an area for storing the parity data which are read out of the disk drives 161, 162, - - -, 16n.

The DC buffer 15d is an area for storing the DC data obtained from the redundant code of the primary parity data as comparison object of the DC value obtained from the redundant code of the user data. Incidentally, the DC values which can be maintained in the DC buffer 15d are two times of the number of the user data blocks of data user which can be maintained in the user data memory area 15b in a case of RAID5 or the like, and are equivalent to the number of the user data blocks which can be maintained in the user data memory area 15b in a case of RAID50 or the like.

Moreover, the DC buffer 15d is set by the cache controller 15a in response to a request from the controller 11, when the user data memory area 15b is allocated in the cache unit 15.

Next, an operation of the storage sub-system according to the aspect of the embodiment will be described. Manipulation of the DC value in the storage sub-system is performed when the sector data are read from the disk drives 161, 162, - - -, 16n into the cache unit 15 (staging), and when the sector data are written from the cache unit 15 to the disk drives 161, 162, - - -, 16n (destaging). Therefore, operation at staging and operation at destaging will be described separately as follows.

Figure 6:
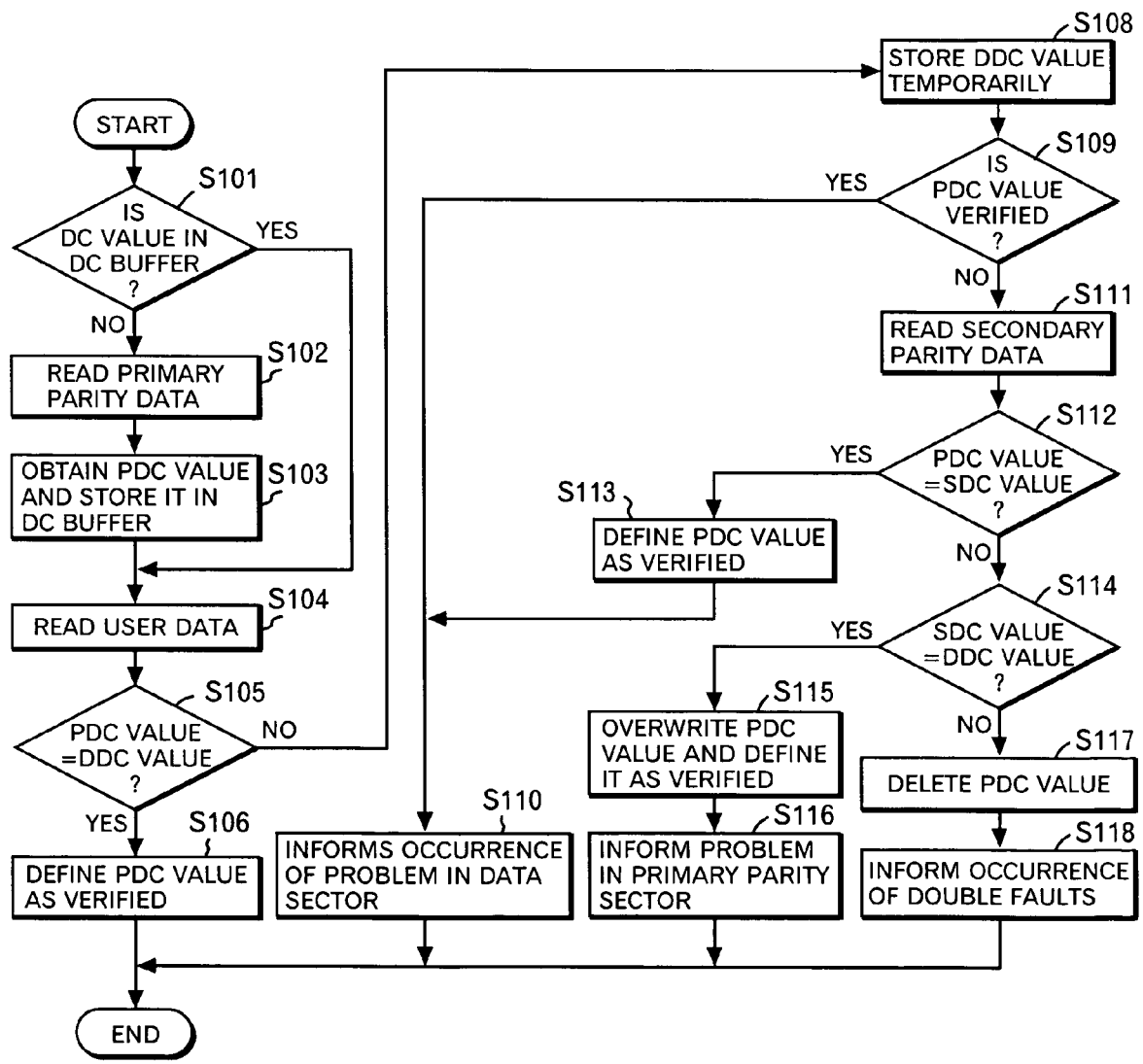
FIG. 6 is a flow chart showing an example of operation of staging process according to the embodiment of the present invention.

Firstly, with reference to FIG. 6, the operation at staging will be described. Note that FIG. 6 shows the operation when staging of one user data is performed. In general, a plurality of user data included in at least one slice is returned in response to a READ command from the host system. However, in this case, it may be considered that the operation of FIG. 6 is performed on each of a plurality of the user data. Moreover, since the parity data maintains the DC value which becomes a collation object of the DC value maintained by the user data, the operation of FIG. 6 is not performed on the parity data.

To begin with, the controller 11 checks whether the DC value of the user data to perform staging exists in the DC buffer 15d (step 101). Since the DC value which was obtained in the past from the primary parity data is stored in the DC buffer 15d, it is checked whether the DC value which must be compared this time exists or not. As a result, when the DC value is judged to exist in the DC buffer 15d, the process advances to step 104. On the contrary, when the DC value is judged not to exist in the DC buffer 15d, the controller 11 instructs the back end I/F unit 14 to read the primary parity data corresponding to this user data. Following this, the back end I/F unit 14 performs a READ request of the primary parity data to the drive. Then, the primary parity data thus read are transferred to the parity data memory area 15c of the cache unit 15 through the data path controller 13 (step 102). Upon this data transfer, the redundant code verifier 13b generates the redundant code from the read primary parity data. Then, the PDC value is obtained by performing the XOR operation of the redundant code thus generated and the redundant code is added to the primary parity data. This PDC value is transferred to the DC buffer 15d (step 103). Note that the PDC value is not defined as verified at this time.

Next, the controller 11 instructs the back end I/F unit 14 to read the user data which performs staging. Following this, the back end I/F unit 14 performs READ request of the user data to the drive. Then, the user data thus read is transferred to the user data memory area 15b of the cache unit 15 through the data path controller 13 (step 104). Upon this data transfer, the redundant code verifier 13b generates the redundant code from the user data thus read. Then, the DDC value is obtained by performing the XOR operation of the redundant code thus generated and the redundant code is added to the user data. This DDC value is compared with the PDC value in the DC buffer 15d (step 105).

As a result, when the PDC value coincides with the DDC value, the PDC value is defined as verified (step 106). That is, the cache controller 15a is instructed so as to understand that the PDC value stored in the DC buffer 15d is reliable as a comparison object of the DDC value for the second and subsequent times. In this case, the staging process is completed without being processed. On the other hand, when the PDC value does not coincide with the DDC value, the redundant code verifier 13b temporarily stores the DDC value thus obtained in the DDC memory area 13c, and informs the controller 11 that there occurred an inconsistency of the DC value.

Following this, the controller 11 checks whether the PDC value is already verified or not (step 109). As a result, when the PDC value is already verified, the controller 11 detects that the problem occurred in the data sector where the user data read at the step 104 were stored, and informs the host system of occurrence of the problem through the front end I/F unit 12 (step 110). Note that afterward, a recovery process is performed autonomously or by the instruction from the host system. However, the procedure is not described here since it is similar to that of the normal RAID system.

On the other hand, if the PDC value is not verified yet, the controller 11 instructs the back end I/F unit 14 to read the secondary parity data. Following this, the back end I/F unit 14 performs a READ request of the secondary parity data to the drive. Then, the secondary parity data thus read is transferred to the data path controller 13 (step 111). Upon this data transfer, the redundant code verifier 13b generates the redundant code from the secondary parity data thus read. Then, the SDC value is obtained by performing the XOR operation of the redundant code thus generated and the redundant code added to the secondary parity data. This SDC value is temporarily stored in the SDC memory area 13d, while the SDC value is compared with the PDC value in the DC buffer 15d (step 112).

As a result, when the PDC value coincides with the SDC value, the redundant code verifier 13b defines the PDC value as verified (step 113). Then, the redundant code verifier 13b detects that the problem occurred in the data sector where the user data read at the step 104 were stored, and informs the host system of occurrence of the problem through the front end I/F unit 12 (step 110). Note that afterward, recovery process is performed autonomously or by the instruction from the host system, however, the procedure is not described here since it is similar to that of the normal RAID system.

On the other hand, when the PDC value does not coincide with the SDC value, the SDC value temporarily stored in the SDC memory area 13d is compared with the DDC value temporarily stored in the DDC memory area 13c (step 114).

As a result, when the SDC value coincides with the DDC value, the redundant code verifier 13b overwrites the PDC value in the DC buffer 15d with the DDC value temporarily stored in the DDC memory area 13c and defines the PDC value as verified. (step 115). Then, the redundant code verifier 13b detects that the problem occurred in the primary parity sector, and informs the host system of occurrence of the problem through the front end I/F unit 12 (step 116). Note that afterward, recovery process is performed autonomously or by the instruction from the host system, however, the procedure is not described here since it is similar to that of the normal RAID system. On the other hand, when the SDC value does not coincide with the DDC value, the controller 11 deletes the PDC value from the DC buffer 15d (step 117). Then, the controller 11 detects an occurrence of double faults, and informs the host system of the occurrence of the faults through the front end I/F unit 12 (step 118). Note that afterward a recovery process is performed autonomously or by the instruction from the host system, however, the procedure is not described here since it is similar to that of the normal RAID system.

Figures 1, 7:
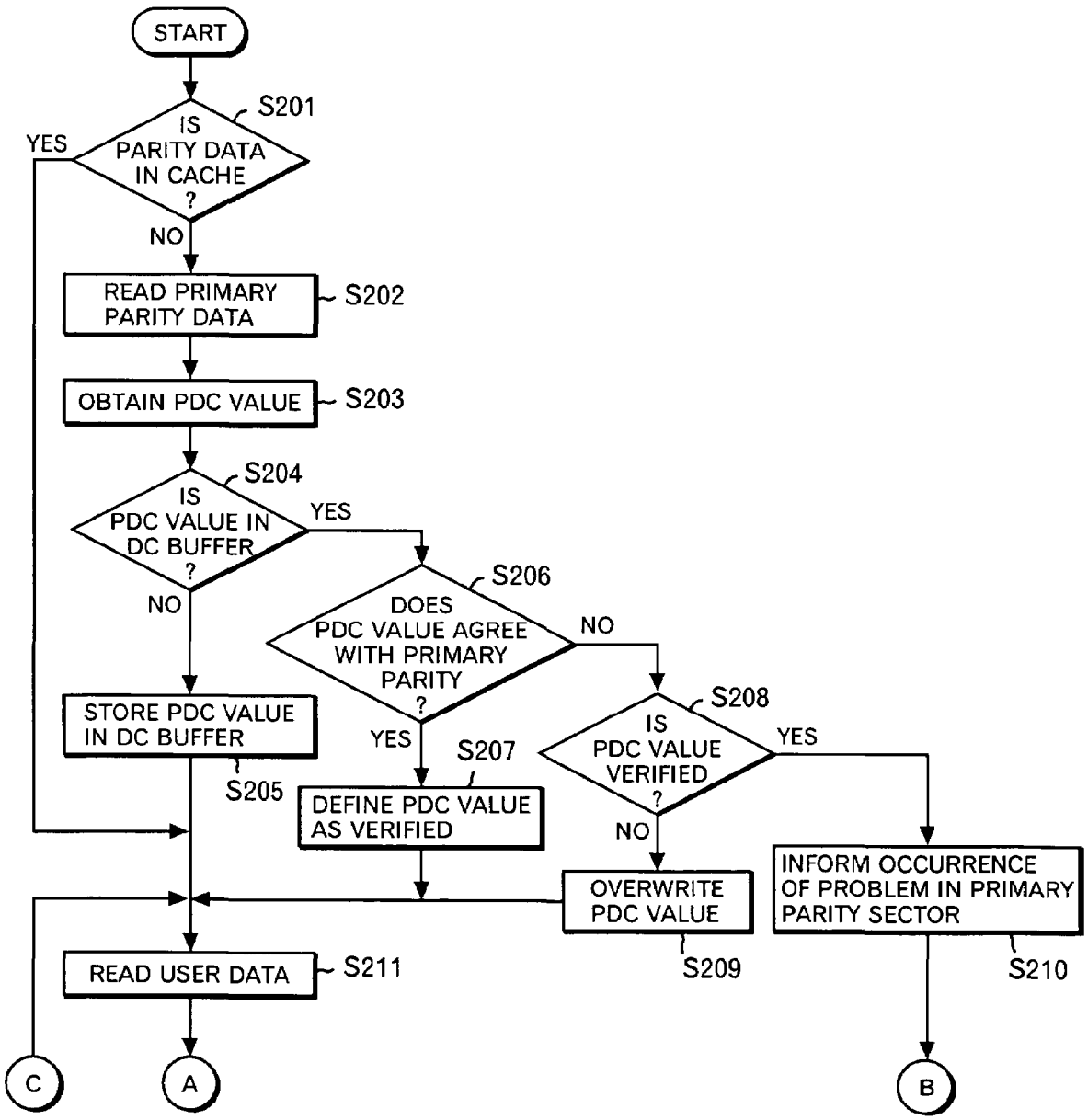
Figures 2, 7:
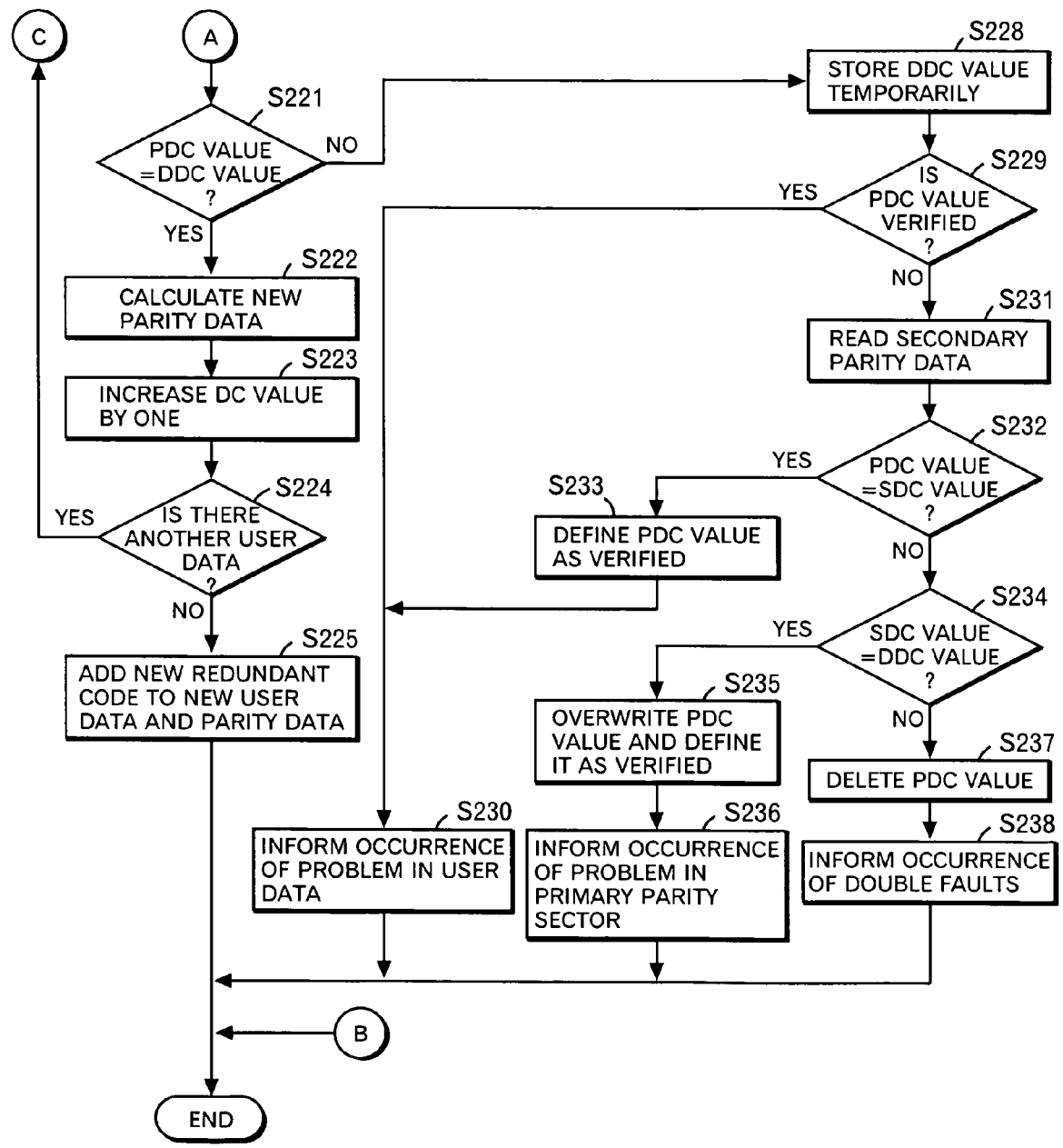
Figure 8:
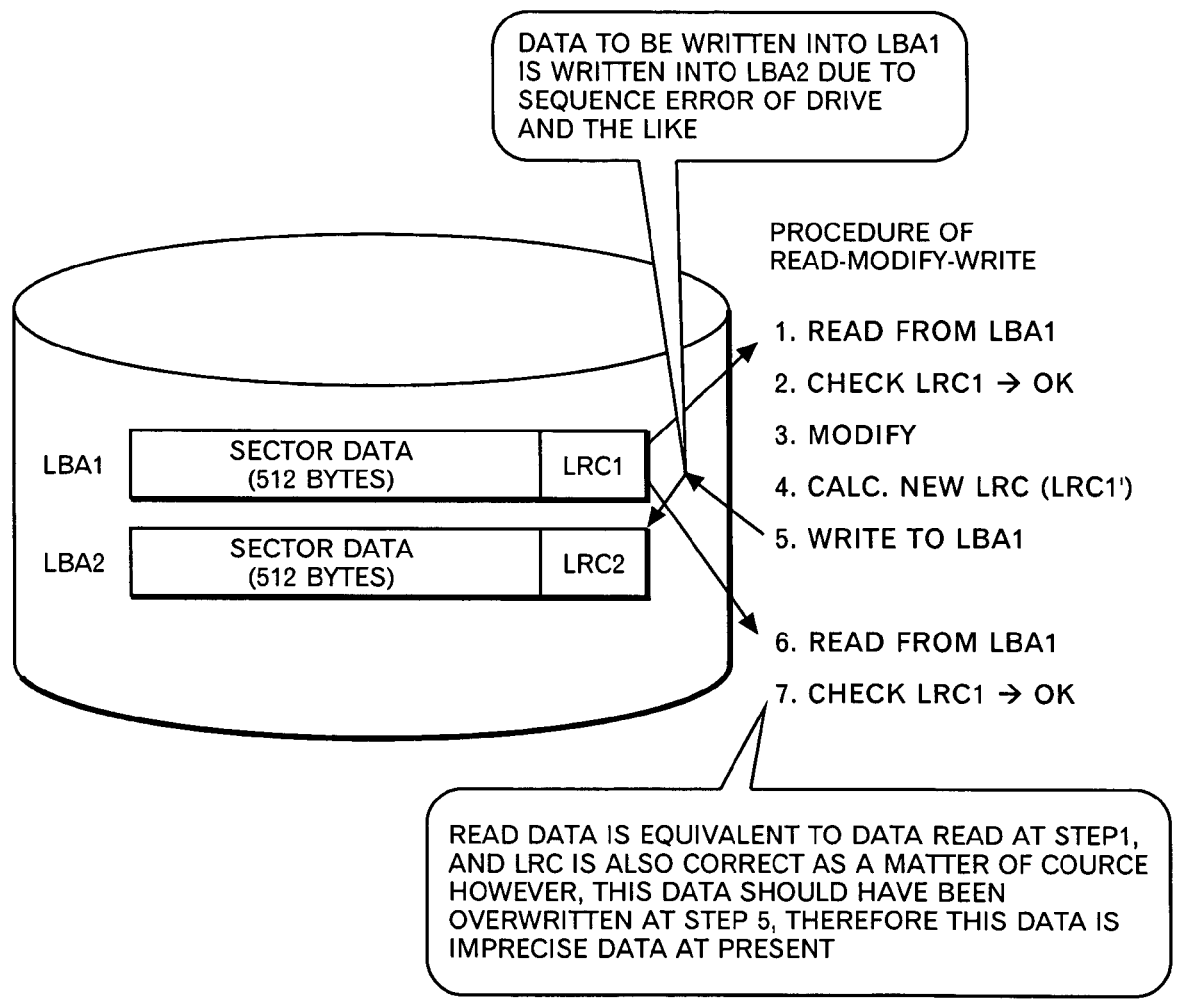
FIG. 8 is a diagram for explaining a problem of the prior art.

Next, with reference to FIGS. 7-1 and 7-2, an operation of destaging will be described. Note that FIGS. 7-1 and 7-2 show the operation of destaging performed per slice. For example, even when only part of a plurality of user data are changed, the parity data are also changed depending on this change. Therefore the process is preferably performed on a per slice basis.

To begin with, the controller 11 checks whether the primary parity data existing in the slice which is the destaging object exists in the parity data memory area 15c in the cache unit 15 (step 201). As a result, when the primary parity data is judged to exist in the parity data memory area 15c, the process advances to step 211.

On the contrary, when the primary parity data is judged not to exist in the parity data memory area 15c, the controller 11 instructs the back end I/F unit 14 to read the primary parity data. Following this, the back end I/F unit 14 instructs the drive to perform a READ request of the primary parity data. Then, the primary parity data thus read is transferred to the parity data memory area 15c of the cache unit 15 through the data path controller 13 (step 202).

Upon this data transfer, the redundant code verifier 13b generates the redundant code from the primary parity data thus read. Then, the PDC value is obtained by performing the XOR operation of the redundant code thus generated and the redundant code added to the primary parity data (step 203).

Next, the controller 11 checks whether the PDC value maintained in the redundant code area in the primary parity sector where this primary parity data are stored already exists in the DC buffer 15d (step 204). Here, if a plurality of the PDC values are maintained in the redundant code area, all of them are treated as a judgment object in a collective manner. For example, in the case of the parity data 1 in FIG. 1, the PDCs 1-1 and 1-2 are treated as judgment objects in a collective manner.

Incidentally, the case where it is judged that the PDC value exists at the step 204, although it is judged that the parity data does not exist at the step 201, is limited to the case of RAID5 or the like. Such a case does not occur in the case of RAID50 or the like. This is because, in the case of RAID5 or the like, the DC value of the user data exists in the redundant code area in the parity sector of the different slice, too, while in the case of RAID50 or the like, the DC value of the user data exists only in the redundant code area in the parity sector of the same slice.

When the PDC value is judged not to exist at the step 204, the PDC value obtained at the step 203 is simply transferred to the DC buffer 15d (step 205), and the process advances to step 211. At this time, the PDC value is not defined as verified.

Meanwhile, when the PDC value is judged to exist, the PDC value obtained at the step 203 is compared with the corresponding PDC value in the DC buffer 15d (step 206).

As a result, when the PDC value obtained at the step 203 coincides with the PDC value in the DC buffer 15d, the PDC value is defined as verified (step 207), and the process advances to step 211. On the other hand, when the PDC value obtained at the step 203 does not coincide with the PDC value in the DC buffer 15d, the PDC value is checked whether it is defined as verified (step 208).

As a result, when the PDC value is found to be verified, occurrence of the problem in the primary parity sector is detected, and it is informed to the host system through the front end I/F unit 12 (step 210) and the process ends. Note that afterward, recovery process is performed autonomously or by the instruction from the host system, however, the procedure is not described here since it is similar to that of the normal RAID system.

Meanwhile, when the PDC value is not defined as verified, the PDC value in the DC buffer 15d is overwritten with the PDC value obtained at the step 203 (step 209), and the process advances to step 211. At this time, the PDC value is not defined as verified.

Next, the controller 11 instructs the back end I/F unit 14 to read the user data which is to be destaged. Following this, the back end I/F unit 14 performs a READ request of the user data to the drive. Then, the user data thus read is transferred to the old data memory area 13e of the data path controller 13 (step 211). Upon this data transfer, the redundant code verifier 13b generates the redundant code from the user data thus read. Then, the DDC value is obtained by performing XOR operation of the redundant code thus generated and the redundant code added to the user data. This DDC value is compared with the PDC value in the DC buffer 15d (step 221). As a result, when the PDC value does not coincide with the DDC value, the redundant code verifier 13b temporarily stores the DDC value thus obtained in the DDC memory area 13c (step 228), and informs the controller 11 that there occurred an inconsistency of the DC value.

Following this, the controller 11 checks whether the PDC value is defined as verified or not (step 229). As a result, when the PDC value is defined as verified, the controller 11 detects that there occurred the problem in the data sector where the user data read at the step 104 were stored, and informs the host system of occurrence of the problem through the front end I/F unit 12 (step 230). Note that afterward, a recovery process is performed autonomously or by the instruction from the host system, however, the procedure is not described here since it is similar to that of the normal RAID system.

On the contrary, when the PDC value is not defined as verified, the controller 11 instructs the back end I/F unit 14 to read the secondary parity data. Following this, the back end I/F unit 14 performs READ request of the secondary parity data to the drive. Then, the secondary parity data thus read is transferred to the data path controller 13 (step 231).

Upon this data transfer, the redundant code verifier 13b generates the redundant code from the secondary parity data thus read. Then, the SDC value is obtained by performing XOR operation of the redundant code thus generated and the redundant code added to the secondary parity data. This SDC value is temporarily stored in the SDC memory area 13d and compared with the PDC value in the DC buffer 15d (step 232).

As a result, when the PDC value coincides with the SDC value, the redundant code verifier 13b defines the PDC value as verified (step 233). Then, the redundant code verifier 13b detects that there occurred the problem in the data sector where the user data read at the step 211 were stored, and informs the host system of occurrence of the problem through the front end I/F unit 12 (step 230). Note that afterward, a recovery process is performed autonomously or by the instruction from the host system, however, the procedure is not described here since it is similar to that of the normal RAID system.

Meanwhile, when the PDC value does not coincide with the SDC value, the SDC value temporarily stored in the SDC memory area 13d is compared with the DDC value temporarily stored in the DDC memory area 13c (step 234).

As a result, when the SDC value coincides with the DDC value, the redundant code verifier 13b overwrites the PDC value in the DC buffer 15d with the DDC value temporarily stored in the DDC memory area 13c, and defines the PDC value as verified (step 235). Then, the redundant code verifier 13b detects that there occurred the problem in the primary parity sector, and informs the host system of occurrence of the problem through the front end I/F unit 12 (step 236). Note that afterward, a recovery process is performed autonomously or by the instruction from the host system, however, the procedure is not described here since it is similar to that of the normal RAID system.

Meanwhile, when the SDC value does not coincide with the DDC value, the controller 11 deletes the PDC value from the DC buffer 15d (step 237). Then, the controller 11 detects that there occurred the problem of double faults, and informs the host system of occurrence of the problem through the front end I/F unit 12 (step 238). Note that afterward, a recovery process is performed autonomously or by the instruction from the host system, however, the procedure is not described here since it is similar to that of the normal RAID system.

Moreover, when the PDC value coincides with the DDC value at the step 221, the data path controller 13 performs an XOR operation of the old data stored in the old data memory area 13e, the parity data stored in the parity data memory area 15c and new user data, an thereby calculates new parity data (step 222). Note that the new parity data may be calculated by the XOR operation (on-the-fly XOR) during data transfer upon reading data from the drive. Then, the data path controller 13 increases the DC value of the user data in the DC buffer 11d by 1 (step 223). Thereafter, it is checked whether another user data which performs destaging exists or not (step 224).

As a result, in the case where it is judged that there is another user data which performs destaging, the process returns to the step 211 and the same process is performed on all the user data which requires destaging. On the other hand, when it is judged that there is no other user data, the controller 11 instructs the back end I/F unit 14 to write the new user data and the new parity data to the drive. Following this, the back end I/F unit 14 performs a WRITE request to the drive. Then, the new user data and the new parity data are transferred to the drive through the data path controller 13.

Upon this data transfer, the redundant code generator 13a generates redundant codes for each of the user data and the parity data from the user data and the parity data. Then, the value obtained by performing the XOR operation of the redundant code generated from the user data and the DC value in the DC buffer 15d is added to the user data as a new redundant code, while the value obtained by performing the XOR operation of the redundant code generated from the parity data and the DC value in the DC buffer 15d is added to the parity data as a new redundant code (step 225). Incidentally, when the redundant code to be added to the user data is generated, only the DC value of the user data is referred to, and when the redundant code to be added to the parity data is generated, the DC values of all user data corresponding to the parity data are referred to.

Operation of the aspect of the embodiment is finished as described above. Incidentally, according to the aspect of the embodiment, the process on staging is performed per sector and the process on destaging is performed per slice. However, it is also possible to perform the process on staging by a strip containing a plurality of sectors in the same disk and to perform the process on destaging by a stripe which is a set of a plurality of slices.

Moreover, according to the aspect of the embodiment, the DC value is added to the sector data by performing XOR operation of the redundant code and the DC value. However, the DC value can be added to the sector data by being embedded in a portion other than the redundant code. In addition, various methods can also be adopted, instead of using the XOR operation, as a method of embedding the DC value. Furthermore, according to the aspect of the embodiment, the DC value of the user data is added to the parity data corresponding to the user data. However, it is not necessarily limited to such an aspect and, for example, an aspect of adding to other user data may be adopted.

Furthermore, according to the aspect of the embodiment, when the PDC value does not coincide with the DDC value, then, it is checked whether the PDC value coincides with the SDC value. However, when the PDC value does not coincide with the DDC value, it may be possible to check whether the SDC value coincides with the DDC value as a next step. In this case, when the SDC value coincides with the DDC value, it can be judged that there occurred the problem in the primary parity sector and when the SDC value does not coincide with the DDC value, it can be judged that there occurred the problem in the data sector.

Moreover, according to the aspect of the embodiment, when the PDC value coincides with the DDC value, the process is performed, assuming that there occurred no problem anywhere. However, in this case, it may be possible to verify whether there occurred a problem in the secondary parity sector. Specifically, this is the case where the PDC value is judged to coincide with the DDC value at the step 221, the PDC value in the DC buffer 15d is judged not to coincide with the PDC value read from the primary parity sector at the step 206, and in addition, the PDC value is judged to be not verified at the step 208. In this case, it is also possible to detect occurrence of the problem by reading the secondary parity data and thereby comparing the SDC value obtained from the secondary parity data with the PDC value in the DC buffer 15d. Moreover, it is also possible to perform recovery process when occurrence of the problem is detected.

Furthermore, an aspect of comparing the PDC value, the SDC value and the DDC value simultaneously can also be adopted. In this case, when only one value among three values is different from the other two values, it is possible to judge that the problem occurred in the sector where the value was obtained.

As described above, according to the aspect of the embodiment, the DC to be updated in conjunction with updating of the user data is added to the user data, and the DC value to be a comparison object is added to the data (for example, parity data for the user data) which becomes necessary to be stored when the user data are stored. By adopting such a configuration, it becomes possible, without consuming drive capacity, to avoid a problem that a storage sub-system returns imprecise data to a host system.

Moreover, the DC value to be a comparison object is added to the data (for example, parity data for the user data) and write/read thereof is performed in synchronization with write/read of the user data. By adopting such a configuration, it becomes possible, without affecting performance of reading from the drive, to avoid a problem that a storage sub-system returns imprecise data to a host system. According to the present invention, it becomes possible to avoid a problem, that a storage sub-system returns imprecise data to a host system, without consuming drive capacity.

Based on the foregoing description it can be appreciated that the use of the exemplary embodiments of this invention avoids the problem that a storage sub-system returns an imprecise data to a host system, without consuming capacity of a drive. Moreover, the use of the exemplary embodiments of this invention avoids the problem that the storage sub-system returns imprecise data to the host system, without affecting performance of reading from the drive.

In accordance with an aspect of the exemplary embodiments of this invention a write-history about certain sector data is added to a different sector data and is verified upon reading. In other words, a unit of the present invention is the unit for detecting imprecise data in a memory, including: addition means for adding history information, which is updated in conjunction with updating of data to be stored in a first sector in the memory, to the data, and to data to be stored in a second sector in the memory; and verification means for verifying the data stored in the first sector and the data stored in the second sector by making a comparison between the history information which has been added to the data stored in the first sector and the history information which has been added to the data stored in the second sector.

In accordance with another aspect of the exemplary embodiments of this invention there is provided a method to verify the write-history of certain sector data, which have been added to the different sector data, upon reading them. The method detects imprecise data in a plurality of memories where a plurality of data processed in synchronization are stored in a distributed manner, including: addition step for adding history information, which is updated in conjunction with updating of one data among a plurality of data to the one data, and to another data among a plurality of data; writing step for writing the one data to a first sector of a memory and the another data to a second sector of the memory; reading step for reading the data stored in the first sector and the data stored in the second sector; and verification step for verifying these two data by comparing the history information respectively added to two read data.

In accordance with a further aspect of the exemplary embodiments of this invention a program for allowing a computer to realize a predetermined function is provided. In this case, the program allows the computer connected to a memory to realize: a function of obtaining a first history information, which is updated in conjunction with updating of a first data to be stored in a first sector in the memory, from the first data and of obtaining a second history information, which is updated in conjunction with updating of a second data to be stored in a second sector in the memory, from the second data; and a function of verifying the first data or the second data by making comparison between the first history information and the second history information.

Although the preferred embodiment of the present invention has been described in detail, it should be understood that various changes, substitutions and alternations can be made therein without departing from spirit and scope of the inventions as defined by the appended claims.

What is claimed is:

1. A method to detect imprecise data, comprising:
    partitioning a data sector area into a user data and a parity data wherein, the parity data is associated with the user data and wherein the parity data includes a primary parity data and a secondary parity data;
    partitioning the data sector area further to include a user data redundant code area, a primary parity data redundant code area, and a secondary parity data redundant code area;
    maintaining a Data Destaging Counter in the user data redundant code area, a Primary Destaging Counter in the primary parity data redundant code area, and a Secondary Destaging Counter in the secondary parity data redundant code area;
    adding history information, which is updated in accordance with updating of the Primary Destaging Counter, to the Primary Destaging Counter and to the Secondary Destaging Counter, and to the Data Destaging Counter;
    the history information comprising:
        a counter value, the counter value being increased by one upon each updating of the Data Destaging Counter;
        generating a first user data redundant code based on the user data;
        generating a second user data redundant code by applying an XOR operation to the first user data redundant code and the counter value;

storing the second user data redundant code and the counter value in the user data redundant code area;
generating a first primary parity data redundant code based on the primary parity data;
generating a second primary parity data redundant code by applying an XOR operation to the first primary parity redundant code;
storing the second primary parity data redundant code and the counter value in the primary parity data redundant code area;
storing the counter value in the secondary parity data redundant code area;
updating the Data Destaging Counter;
writing the Primary Destaging Counter to a first sector in a memory and writing the Secondary Destaging Counter to a second sector in the memory and writing the Data Destaging Counter to a third sector in the memory;
reading sector data stored in the first sector and sector data stored in the second sector and sector data stored in the third sector;
verifying the Primary Destaging Counter, the Secondary Destaging Counter, and the Data Destaging Counter by comparing the history data added respectively to the read-out sector data; and verifying a Primary Destaging Counter value associated with the Primary Destaging Counter when the Primary Destaging Counter value coincides with a Data Destaging Counter value, wherein the Data Destaging Counter value is associated with the Data Destaging Counter;
detecting a fault when history information added to parity data stored in the Primary Destaging Counter does not coincide with history information added to the parity data stored in the Secondary Destaging Counter and history information added to the parity data stored in the Secondary Destaging Counter does coincide with the history information added to the user data stored in the Data Destaging Counter, then the history information stored in the Data Destaging Counter is written over the history data stored in the Primary Destaging Counter, and the parity data, stored respectively in the Primary Destaging Counter and the Secondary Destaging Counter and the user data stored in the Data Destaging Counter, are verified by comparing any one of the history information added to the parity data stored in the Primary Destaging Counter and Secondary Destaging Counter with history information added to the user data stored in the Data Destaging Counter;
detecting a double fault when the Secondary Destaging Counter value does not coincide with the Data Destaging Counter value, and the Primary Destaging Counter value does not coincide with the Secondary Destaging Counter; and
deleting the Primary Destaging Counter value from a Destaging Counter buffer when the Secondary Destaging Counter value does not coincide with the Data Destaging Counter value.

2. The method according to claim 1, the method further comprising:
informing a host system of an occurrence of a fault when history information added to the parity data stored in the Primary Destaging Counter does not coincide with history information added to the parity data stored in the Secondary Destaging Counter data; and
informing a controller by a redundant code verifier of an inconsistency in the Destaging Counter value when the Primary Destaging Counter value does not coincide with the Data Destaging Counter value.

3. A device for detecting a data error in a memory, comprising:
a storage sub-system controller;
a memory operatively coupled to the storage sub-system controller, wherein:
the memory is partitioned into a user data and a parity data,
the parity data includes a primary parity data and a secondary parity data,
the memory is further partitioned to include a user data redundant code area, a primary parity data redundant code area, and a secondary parity data redundant code area;
a counter value stored in the user data redundant code area wherein the counter value is associated with a Data Destaging Counter;
a first counter value copy stored in the primary parity data redundant code area as a Primary Destaging Counter;
a second counter value copy is stored in the secondary parity redundant code area as a Secondary Destaging Counter;
an addition unit for adding history information to the sector data, which is updated in accordance with updating of the parity data to be stored in the Primary Destaging Counter, and to parity data to be stored in the Secondary Destaging Counter in the memory;
a verification unit for
verifying the parity data stored in the Primary Destaging Counter and the parity data stored in the Secondary Destaging Counter by making a comparison between the history information which has been added to the parity data stored in the Primary Destaging Counter and the history information which has been added to the parity data stored in the Secondary Destaging Counter;
detecting a fault when history information added to parity data stored in the Primary Destaging Counter does not coincide with history information added to parity data stored in the Secondary Destaging Counter, and
detecting a double fault when a Secondary Destaging Counter value associated with the Secondary Destaging Counter does not coincide with a Data Destaging Counter value associated with the Data Destaging Counter, and a Primary Destaging Counter value does not coincide with the Secondary Destaging Counter;
a redundant code verifier generating redundant code upon the transfer of secondary parity data to a data path controller; and
the storage sub-system controller configured to specify to a host system where in the memory a fault or double fault occurs.

4. The device according to claim 3, where the addition unit embeds the history information, which is updated in accordance with updating of the parity data to be stored in the Primary Destaging Counter, in a redundant code to detect an error of the user data and in a redundant code to detect an error of the parity data to be stored in the Secondary Destaging Counter.

5. The device according to claim 3, where an access is performed to the Secondary Destaging Counter in accordance with the access to the Primary Destaging Counter.

6. The device according to claim 3, wherein parity information to detect an error of the parity data to be stored in the Primary Destaging Counter is stored in the Secondary Destaging Counter.

7. The device according to claim 3, where the addition unit adds the history information, which is updated in accordance with updating of the parity data to be stored in the Primary Destaging Counter, to the user data to be stored in a Data Destaging Counter; and the verification unit verifies the primary parity data, the secondary parity data, and the user data, which are stored respectively in the Primary Destaging Counter, the Secondary Destaging Counter and the Data Destaging Counter, by comparing each history information added to the primary parity data, the secondary parity data, and the user data stored respectively in the Primary Destaging Counter, the Secondary Destaging Counter and the Data Destaging Counter.

8. A computer program product comprising a computer useable medium including a computer readable program, wherein the computer readable program, comprises:
  a set of instructions for obtaining first history information that is updated in accordance with updating of a Primary Destaging Counter stored in a first parity data sector of a memory;
  a set of instructions for obtaining second history information that is updated in accordance with updating of a Secondary Destaging Counter stored in a second parity data sector of the memory; and
  a set of instructions for verifying the Primary Destaging Counter or the Secondary Destaging Counter by comparing the first history information or the second history information with a Data Destaging Counter located outside of the first parity data sector and the second parity data sector;
  a set of instructions for detecting a double fault when a Secondary Destaging Counter value does not coincide with a Data Destaging Counter value, and a Primary Destaging Counter value does not coincide with the Secondary Destaging Counter value;
  a set of instructions for generating redundant code by a redundant code verifier upon the transfer of a secondary parity data to a data path controller; and
  a set of instructions for informing a host system of the detection of a double fault.

9. The computer program product according to claim 8, responsive to the first history information coinciding with the second history information when the Primary Destaging Counter or the Secondary Destaging Counter are updated, further comprising a set of instructions for updating the first history information and adding it to the Primary Destaging Counter, and updating the second history information and adding it to the Secondary Destaging Counter.

10. The computer program product according to claim 8, where the first history information is obtained from redundant code to detect an error of the Primary Destaging Counter by obtaining the first history information; and
  the second history information is obtained from redundant code to detect an error of the Secondary Destaging Counter by obtaining the second history information.

11. The computer program product according to claim 8, where the Secondary Destaging Counter comprises parity data to detect an error of the Primary Destaging Counter.

12. The computer program product according to claim 8, further comprising:
  a set of instructions for obtaining third history information that is updated in accordance with updating of the Data Destaging Counter stored in a third sector of the memory; and
  when the first history information does not coincide with the second history information, verifying the Primary Destaging Counter, the Secondary Destaging Counter and the Data Destaging Counter by comparing the first history information or the second history information with the third history information.

13. A controller for a data storage system that comprises a plurality of data storage disks comprising a data storage memory and a cache, wherein the data storage memory includes a user data area and a redundant code area, said controller comprising a first interface for coupling to the data storage memory and a second interface for coupling to a host, said controller comprising redundant code verifier circuitry, responsive to data being transferred to the cache from the data storage memory to compare a Primary Destaging Counter value, indicative of write-history information, that is contained in a redundant code of the data with a Secondary Destaging Counter value that is generated by an XOR operation on a Primary Destaging Counter and contained in a redundant code of corresponding data integrity data, wherein the Secondary Destaging Counter value is stored outside of the user data area in the redundant code area, to thereby verify whether the data being transferred is in error;
  said controller detecting a double fault when the Secondary Destaging Counter value does not coincide with a Data Destaging Counter value, and the Primary Destaging Counter value does not coincide with the Secondary Destaging Counter; and
  said controller generating redundant code by a redundant code verifier upon the transfer of secondary parity data to a data path controller.

14. A controller according to claim 13, said circuitry being responsive to an error being detected, when reading previous data to be used for creating data integrity data, to operate a redundant code generator to include with new data and the data integrity data a redundant code that contains a new Destaging Counter value.

15. The controller according to claim 14, where the data integrity data comprises parity data.

16. The controller according to claim 13, where said controller informs the host via said second interface of an occurrence of a data error.

17. The controller according to claim 13, where the plurality of data storage disks are organized in a RAID configuration.

* * * * *